United States Patent [19]
Osborne

[11] 3,731,784
[45] May 8, 1973

[54] CONVEYORS

[75] Inventor: Michael Bryon Osborne, Kirkella, Hull, England

[73] Assignee: Kingston Conveyors Limited, Hull, England

[22] Filed: Dec. 21, 1971

[21] Appl. No.: 210,495

[30] Foreign Application Priority Data

Dec. 30, 1970 Great Britain.....................61,832/70

[52] U.S. Cl. ..............................................198/31 AB
[51] Int. Cl. ..............................................B65g 47/24
[58] Field of Search ......................198/31 R, 31 AA, 198/31 BB, 31 AC

[56] References Cited

UNITED STATES PATENTS

| | | | |
|---|---|---|---|
| 3,327,848 | 6/1967 | Barnhart | 198/31 R |
| 2,857,037 | 10/1958 | Breeback | 198/31 AA |

*Primary Examiner*—Richard E. Aegerter
*Attorney*—William R. Drucker

[57] ABSTRACT

A mechanism for dividing a continuously moving stream of single articles fed by a conveyor belt between fixed spaced guides into a plurality of streams or stream of two or more articles abreast comprising an article feeding rotary worm laterally displaceable relative to a set of fixed guides defining a plurality of paths, an article linear-movement guide, spaced from and parallel to the lead end of worm, is movable with the lateral displacement of such worm, and a pair of spaced linear guides are pivoted with respect to the fixed spaced guides and angularly rotatable with the lateral movement of the worm and its spaced guides such that the articles fed by the conveyor are brought from juxta position into spaced relation by the rotation of the worm and then introduced thereby on lateral displacement thereof into the several paths of the set of fixed guides along which they move due to another conveyor belt(s).

3 Claims, 6 Drawing Figures

Patented May 8, 1973 3,731,784

CONVEYORS

BACKGROUND TO THE INVENTION

The known conveyors which divide a stream of single articles into a plurality of streams or stream of two or more articles abreast have one disadvantage that there is necessarily an intermittent movement of the articles and they are therefore unsuitable for high speed operation as is required for modern high speed filling, wrapping and similar machines.

This invention relates to conveyors such as are used with packaging, filling, wrapping and like machines, and is particularly concerned with such conveyors adapted to divide a stream of articles into two or more streams.

Now therefore the object of the present invention is to provide a conveyor for continuously moving juxtaposed articles with mechanism for dividing the single stream into a plurality of streams, which may handle articles of a variety of shapes and materials, in particular glass and plastics material bottles or containers and metal cans.

To this end according to the invention a mechanism for dividing a continuously moving stream of single articles fed by a conveyor belt between fixed spaced guides into a plurality of streams or stream of two or more articles abreast comprising an article feeding rotary worm laterally displaceable relative to a set of fixed guides defining a plurality of paths, an article linear-movement guide, spaced from and parallel to the lead end of the worm, is movable with the lateral displacement of such worm, and a pair of spaced linear guides are pivoted with respect to the fixed spaced guides and angularly rockable with the lateral movement of the worm and its spaced guide such that the articles fed by the conveyor are brought from juxta position into spaced relation by the rotation of the worm and then introduced thereby on lateral displacement thereof into the several paths of the set of fixed guides along which they move due to another conveyor belt(s).

The main use of the mechanism will be for dividing a stream of single articles into a plurality of streams or rows of articles, of which there may be any number with a related length of feed worm, but it may also be used for collecting articles from a plurality of streams through the set of fixed guides and feeding them as a single stream.

The speed of continuous rotation of the worm and the pitch of its grooves and hence the feed rate of the articles controlled thereby are related to its lateral movements or reciprocation for the continuous movement of the articles and their introduction into the paths of the set of fixed guides, there being two, four or more such paths according to need.

The worm, its drive and its overlapping linear guide may be mounted on a displaceable carriage under which may pass the feeding conveyor belt or the equivalent which is not laterally displaced. The one pivoted linear guide may be pivoted to the laterally displaceable guide or to said carriage and the other pivoted linear guide pivoted to the carriage adjacent the end of the worm so that the articles in being fed forward pass between the guide laterally movable with the worm and the worm, without interruption in the movement of the stream of articles due to the lateral displacement of the carriage.

In the preferred embodiment of the mechanism, the slide, and hence the worm and its spaced guide, is continuously moved in its to and fro or reciprocating movement but such movement may alternatively be intermittent and be effected by closing a clutch in a driving system either in timed relation to the rotation of the worm or by electronic actuation controlled by the movement of the articles. The continuous movement of the slide may be effected by rotating contour cam acting on at least one rockable arm when such cam may effect both the forward and return movement of the slide or only the forward movement thereof when the return movement may be effected by a spring.

DESCRIPTION OF EMBODIMENT OF THE INVENTION

Figure 1:
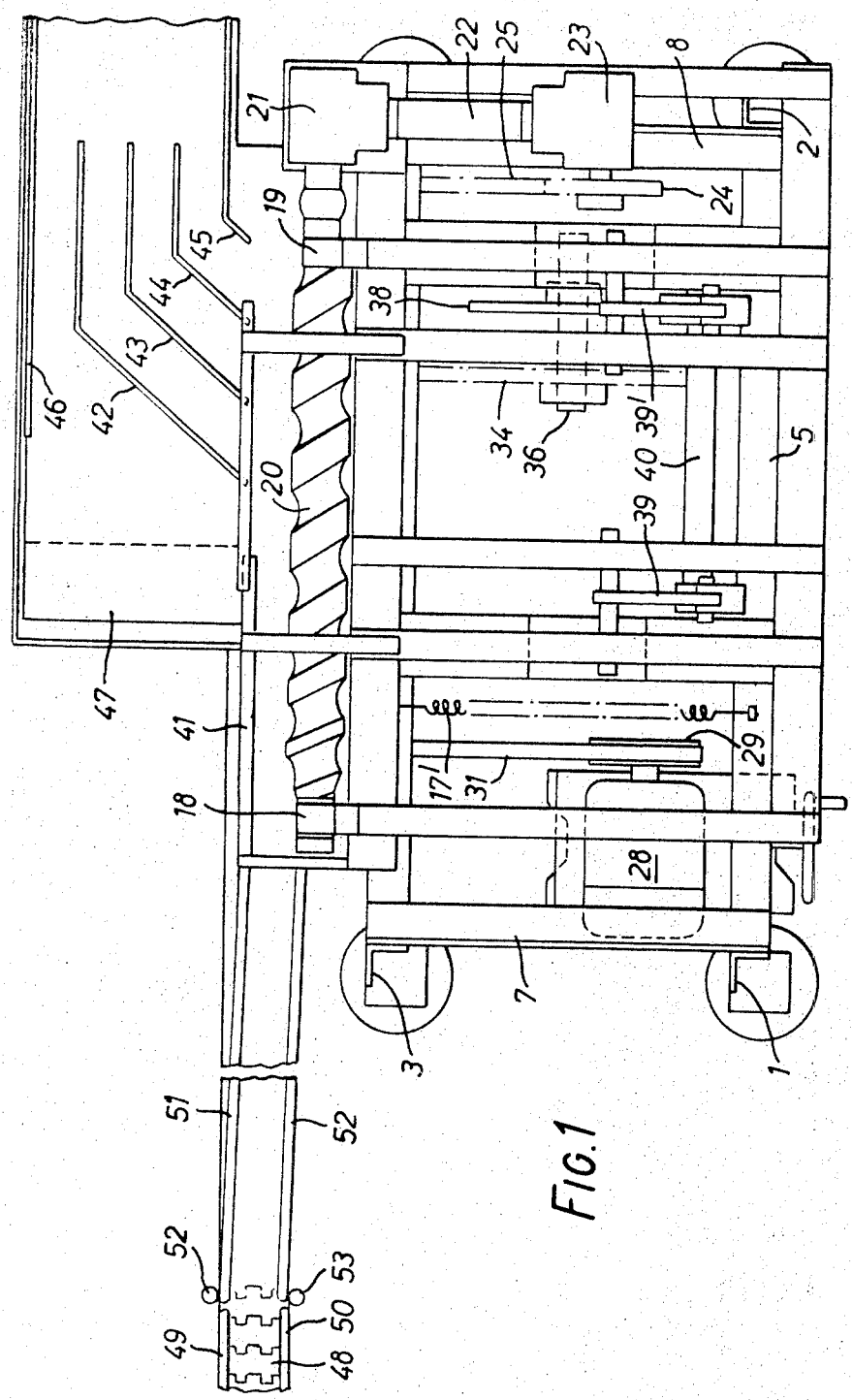
FIG. 1 is a plan view of the stream dividing mechanism in which non important details are omitted for clarity of illustration.
Figure 2:
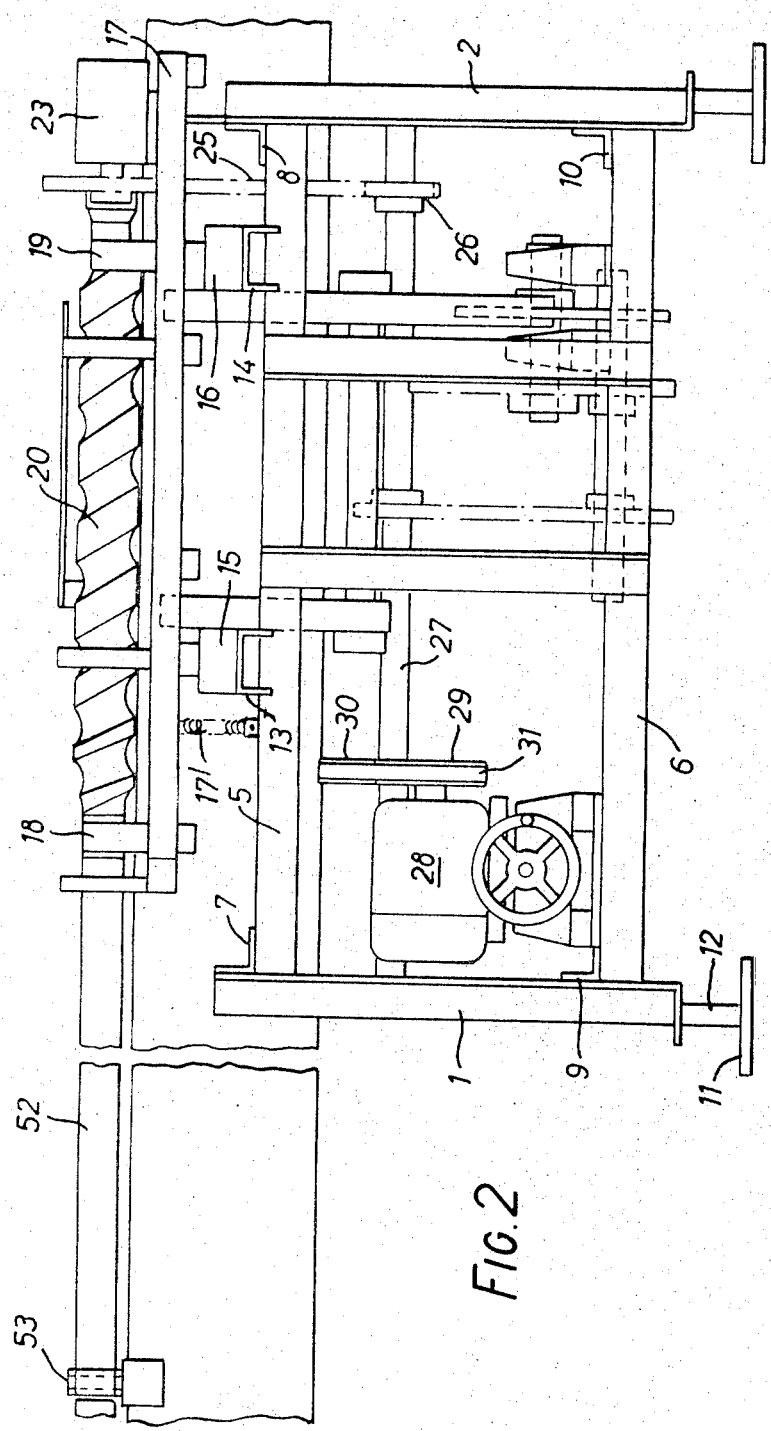
FIG. 2 is a front elevation of the machine.
Figure 3:
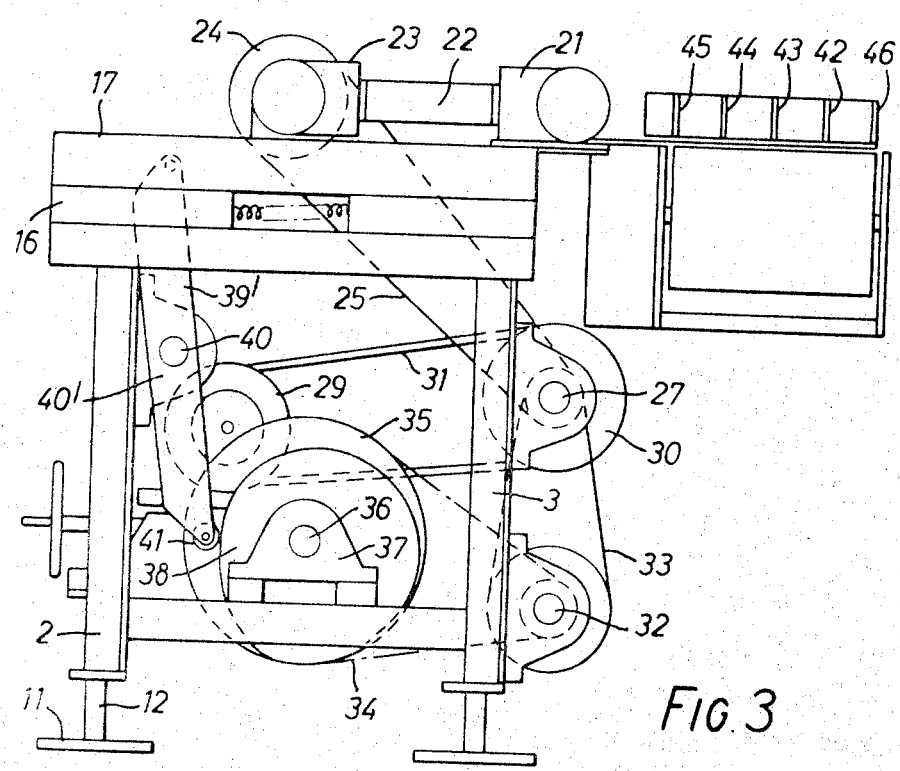
FIG. 3 is an end elevation of the machine being a view on the right hand side of FIG. 2, and FIGS. 4, 5 and 6 are plan views of the machine conveyor worm and its linear guide to illustrate the stages of operation in dividing continuously moving stream of juxtaposed articles into a stream of articles four abreast.

Referring now to the said drawings and in particular to FIGS. 1 to 3 thereof, the mechanism about to be described may be built into a conveyor system but conveniently and as shown is mounted in a framework of rectangular shape comprising corner vertical members 1, 2, 3 and 4, upper and lower front longitudinal members 5, 6 are corresponding rear members, and upper and lower transverse end members 7, 8 and 9, 10 respectively. Each vertical members has a foot 11 on a leg 12 which is adjustable to set the height and level of the framework with respect to a floor or supporting surface. The upper longitudinal members carry two transverse members 13, 14 on which are linear bearings 15, 16 of a slidable carriage 17 also of rectangular shape and formed of front and rear longitudinal members and end as well as other transverse members.

The sliding carriage 17 carries, near its rear edge, the bearings 18, 19 of a feed worm 20 of increasing diameter at its lead end (left hand end as seen in FIGS. 1 and 2) and of increasing pitch of its groove. Such worm 20 is made of rubber or synthetic material with a throughgoing metal shaft an end of which is rotatable through bevel gearing in the housing 21 mounted on the carriage and receiving motion through a telescopic shaft 22 from bevel gearing in a housing 23 mounted on the frame, the telescopic shaft 22 catering for movement of the carriage in sliding relative to the framework. The gearing in the housing 23 receives motion from a pulley or chain wheel 24 through an endless drive belt or chain 25 from a like wheel 26 on a main longitudinal drive shaft 27 journalled in bearings on the framework and driven by an electric motor 28 through pulleys 29, 30 and a driving belt 31.

The main drive shaft 27 also drives a lay shaft 32 through an endless belt or chain 33. A pulley or chain wheel on the shaft 32 drives through an endless drive 34 a pulley or chain wheel 35 on a shaft 36 journalled in bearings 37 carried by the framework. Also fast on the shaft 36 is a cam 38.

Two rocker arms 39, 39' are secured to a common horizontal shaft 40 journalled in bearing 40' on the framework and are connected at their upper ends to the carriage 17. At its lower end the rocker arm 39' carries a cam-follower roller 41 which bears on the contour cam 38, in arrangement such that rotation of the cam 38 through one revolution rocks the arms 39, 39' for effecting sliding displacement of the carriage from normal position to displaced position and back to normal position, return to which latter position is effected by at least one spring 17' provided for the purpose and extending between a front longitudinal member of the framework and a rear longitudinal member of the carriage.

The gearing and drive ratios and the contour of the cam 38 are such that the slide is moved to and fro in timed relation to the rotation of the worm 20 but in an alternative arrangement a clutch may be provided in the drive to the cam 38 such that on closing such clutch the cam is rotated one revolution to effect a reciprocation of the carriage intermittently in timed relation to the rotation of the worm 20.

The carriage 17 also carries a fixed linear-movement article guide 41 spaced from and overlapping in parallel relation the lead end of the worm 20. The carriage 17 is movable relative to fixed structure, which may be carried by the framework, which carries a plurality (four shown) of fixed guides 42, 43, 44 and 45 defining a number of paths, i.e. four paths with the four fixed guides shown. The fixed guide 45 may be extended (as shown in FIG. 1) to provide side guidance to cooperate with an opposed fixed side guide 46. A conveyor belt 47 passes around a pulley drum and moves (from left to right as shown in FIG. 1) under the fixed guides 42, 43, 44 and 45 and between the extension of the latter and the opposed guide 46.

Thus, articles introduced individually in front of the end of the guide 42 and between the guides 42, 43: 43, 44 and 44, 45 are carried along by the conveyor 47 as a stream of articles four abreast.

Figure 4:
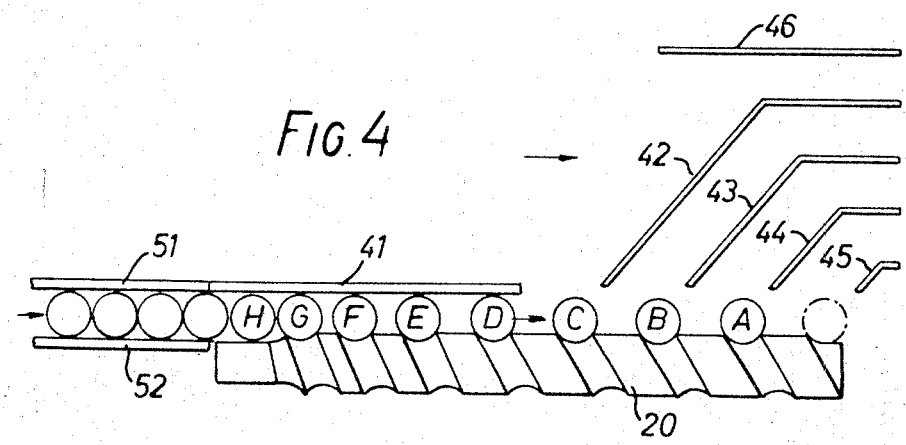
Figure 5:
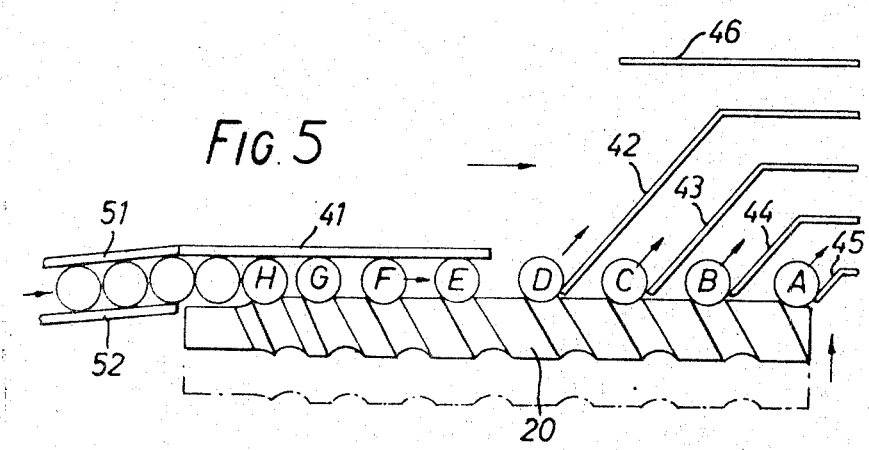
Figure 6:
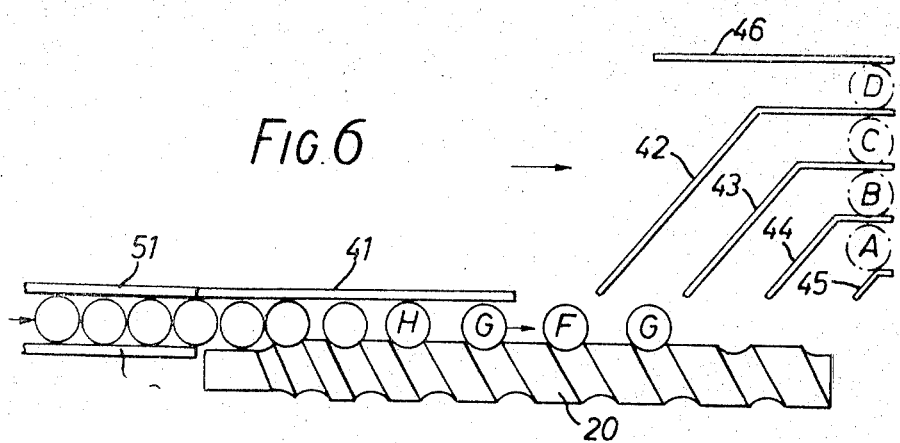

The mechanism described is used in conjunction with a conveyor 48 for carrying along a continuously moving single stream of articles, such as bottles, or cans, between fixed spaced guides 49, 50. Between the guide 41 and the guide 49 is a linear-movement guide 51 rockable about a vertical pivot 52, and between the lead end of the worm 20 and the guide 50 is another linear movement guide 52 (at the spacing of the guides 49, 50) rockable about a vertical pivot 53. The "free" end of the guide 51 is pivotally connected to the end of the guide 41 or to the carriage, and the like end of the guide 52 is pivotally connected to the carriage such that as such carriage is moved to and fro the guides 51, 52 follow that movement and the articles carried along by the conveyor 48, which extends to the remote end of the worm 20 in the plane of the conveyor 47, are lead by the guides 51, 52 to between the guide 41 and the lead end of the worm 20. Due to the pitch of the grooves of the worm 20 and its speed of rotation for example four turns for each reciprocation of the carriage, the worm individually accelerates articles and brings them into spaced relation. MOvement of the slidable carriage 17 towards the guides 42, 43, 44 and 45 brings such articles in front (in the sense of the movement of the conveyor 47) of the guide 42 and between the guides 42, 43: 43 and 44, 45 along which they are then moved by the conveyor 47 so that they are carried forward as a stream of articles four abreast. As the carriage moves away from and then reapproaches the fixed guides 42, 43, 44 and 45, the worm accelerates four more articles into spaced relation and brings them to required position for guidance by such fixed guides on completion of the next forward movement of the carriage without interruption of the continuous movement of the articles between the guides 49, 50. This is illustrated in FIGS. 4, 5 and 6, and shows in FIG. 4 four articles A, B, C, D already brought into spaced relation by the worm 20 at the point of retraction of the carriage. Then as the carriage moves towards the fixed guides 42, 43, 44 and 45 article A reaches the position shown in dotted lines, article B reaches the position of article A and so on at the completion of forward carried movement, substantially as shown in FIG. 5. As the carriage retracts the further articles E, F, G and H are moved as were the articles A, B, C and D with a continuous movement of such articles and of the articles still between the guides 49, 50 so that there is no interruption in the flow.

What I claim is:

1. Mechanism for dividing a continuously moving stream of single articles into a stream of several articles abrest, including a primary conveyor for feeding said single articles in juxtaposition, a rotatable feed worm having a lead end of increasing pitch to move said articles from juxtaposition to spaced relationship, an article linear movement guide spaced from and overlapping said lead end of said worm, means for guiding articles fed by said primary conveyor to a position between said linear movement guide and said lead end of said worm, a set of fixed spaced apart guides, means for laterally moving said linear movement guide and said worm to and fro relative to said fixed spaced apart guides, and at least one secondary conveyor passing below said spaced apart guides for moving along articles entered into said spaced apart guides by the lateral movement of said worm.

2. Mechanism as claimed in claim 1, including a first conveyor belt for continuously moving a single stream of articles in juxta position between fixed guides, a pair of pivotally mounted rockable article guides extending between said fixed guides and said lead end of said worm and said guide spaced therefrom, means for rocking said rockable guides with the lateral movement of said worm, and a second conveyor belt for moving articles guided by said set of fixed guides.

3. Mechanism as claimed in claim 1 including stationary lateral guide means for guiding articles on said primary conveyor and comprising a first guide member and a second guide member spaced therefrom, a first rockable guide pivotally connected at its ends to said first guide member and to said article linear guide member, a second rockable guide pivotally connected to said second guide member, and means for simultaneously rocking said first and second rockable guide members with the lateral movement of said worm.

* * * * *